(12) United States Patent
Brenner et al.

(10) Patent No.: US 11,921,590 B2
(45) Date of Patent: Mar. 5, 2024

(54) APPLICATION CONSISTENT NETWORK BACKUP USING THREE PHASE FULL QUORUM

(71) Applicant: EMC IP Holding Company LLC, Hopkinton, MA (US)

(72) Inventors: Adam Brenner, Mission Viejo, CA (US); Mark Malamut, Aliso Viejo, CA (US); Arun Murti, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 129 days.

(21) Appl. No.: 17/236,196

(22) Filed: Apr. 21, 2021

(65) Prior Publication Data

US 2022/0342769 A1   Oct. 27, 2022

(51) Int. Cl.
*G06F 11/14* (2006.01)
*H04L 67/1097* (2022.01)
*H04L 69/40* (2022.01)

(52) U.S. Cl.
CPC ...... *G06F 11/1464* (2013.01); *G06F 11/1448* (2013.01); *G06F 11/1469* (2013.01); *H04L 67/1097* (2013.01); *H04L 69/40* (2013.01)

(58) Field of Classification Search
CPC ............ G06F 11/1464; G06F 11/1448; G06F 11/1469; H04L 67/1097; H04L 69/40; H04L 41/0856

USPC ........................................................ 711/162
See application file for complete search history.

(56) References Cited

U.S. PATENT DOCUMENTS

| | | | | |
|---|---|---|---|---|
| 2002/0116485 | A1* | 8/2002 | Black | H04L 41/344 709/227 |
| 2006/0036896 | A1* | 2/2006 | Gamache | G06F 11/2023 714/E11.073 |
| 2014/0317059 | A1* | 10/2014 | Lad | G06F 11/1458 707/649 |
| 2020/0084178 | A1* | 3/2020 | Dreyer | H04L 61/3025 |

* cited by examiner

*Primary Examiner* — Gautam Sain
*Assistant Examiner* — Wei Ma
(74) *Attorney, Agent, or Firm* — Staniford Tomita LLP (57) ABSTRACT

A three-phase full quorum commit method enabling backing up of network devices that do not offer direct hooks in order to have application consistent protection. Devices are verified to be ready to perform a backup, and a condition of reaching and maintaining a full quorum of devices within a maximum time period is required before the system can be backed up. The three phase backup process reduces the chance of changes to network devices from corrupting consistency among the saved states of the different and disparate network devices. Multiple devices of different makes and models participate together as a unified backup as a network partition and all devices are verified as being in a ready state. The device configuration data is moved from device memory to local disk, and can then be tiered to secondary storage.

20 Claims, 9 Drawing Sheets

APPLICATION CONSISTENT NETWORK BACKUP USING THREE PHASE FULL QUORUM

TECHNICAL FIELD

Embodiments relate generally to networking equipment, and more specifically to consistent backup of switches, routers, firewall and other network infrastructure devices.

BACKGROUND OF THE INVENTION

In a large network, the number of network equipment (infrastructure) devices can number in the thousands and be spread across multiple geographic locations. There are several challenges customers and network operators face with regard to installing and maintaining such devices. Networking equipment such as managed switches, core routers and firewall devices have important configuration data that is stored on each device. These configurations are stored on each device and include network (e.g., VLAN) tags, per port activation/link speed, domain routing protocol (e.g., BGP/OSPF) settings, firewall rules, high availability/redundancy settings, and so on, and are generally critical to running a network.

Network equipment devices are critically different from other node devices in that they are special devices with restricted interfaces. Some only offer Telnet and SSH support, while others have ReST APIs. These interfaces are exposed on a different out-of-band network which may exists as a separate layer 1 connection to the production network and most other network assets. Data protection of network equipment devices is critical because these infrastructure components are connected together and share matching rules that can make up the larger network. However, current network management systems do not offer sufficient application consistent data protection for network equipment devices. Consequently, users can often be left in a situation where one device, such as a core router, might have a mismatch of rules with another device, such as a top of rack switch, resulting in a loss of network connectivity.

Present application consistent backup methods involve using direct hooks into the application. For example, an app-consistent backup of a Microsoft SQL server would include an application agent from the protection software that knows how to interact with the SQL server to perform application consistent protection. This might include gathering a list of databases, quiescing the databases, and then performing the backup. Other vendors and software might offer similar capabilities. However, such methods work for standard application-based backups, but not for network equipment device backups. In a traditional application based backup, the applications are from the same vendor, have the same version, and so on. On the other hand, multiple network devices (e.g., managed switches, routers, firewalls, etc.) can all come from different vendors, and be of different models and versions. Running an agent process on a network device is not necessarily a straightforward process as many network devices use custom logic circuits and do not run standard (e.g., x86) specifications. System-wide backups of these infrastructure devices can thus capture inconsistent states if there are changes during the backup process that, in turn, can cause problems when the network is restored.

What is needed, therefore, is a method of providing application consistent data protection of the configuration information across multiple network devices using their own provided interfaces.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Avamar are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method and system of providing application consistent data protection of the configuration information across multiple network devices using their provided interfaces.

Figure 1:
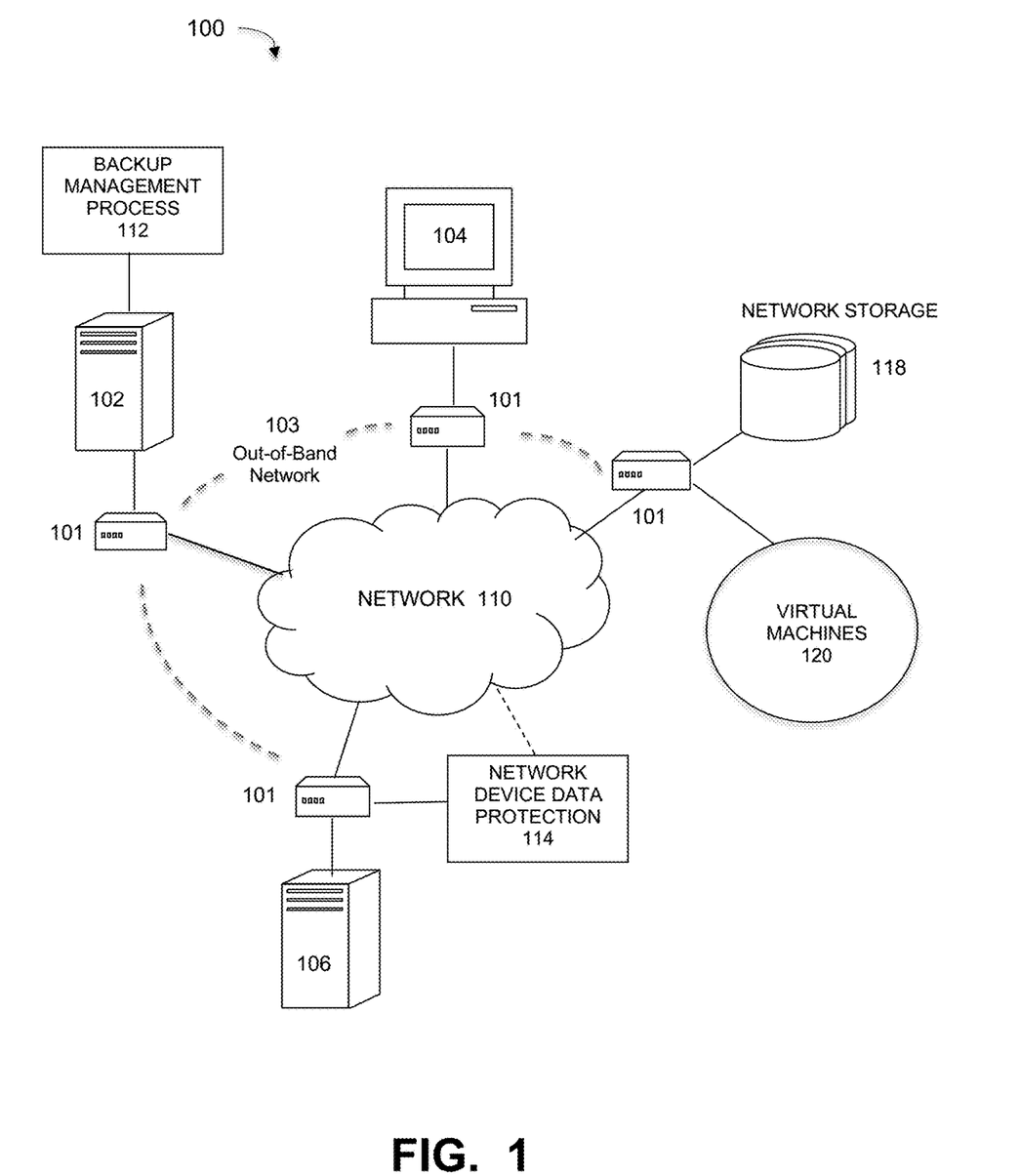
FIG. 1 illustrates a computer network system that applies data protection mechanisms to out-of-band network equipment devices and provides application consistent data protection of configuration information, under some embodiments.

FIG. 1 illustrates a computer network system that applies data protection mechanisms to out-of-band network equipment devices and provides application consistent data protection of configuration information, under some embodiments. For network 100, a number of network resources, such as server computers 102, 106, desktop or portable computers 104, storage devices 118, and other similar system resources.

For the embodiment of FIG. 1, at least one server 102 may be a backup and/or storage server that executes a data storage or backup management process 112 that coordinates or manages the backup of data from one or more data sources to storage devices, such as network storage 118, client storage, and/or virtual storage devices 120. With regard to virtual storage, any number of virtual machines (VMs) or groups of VMs (e.g., organized into virtual centers) 120 may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 118, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to each other and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

For the embodiment of FIG. 1, each computer, storage device, or other resource is connected to network 110 or other resources through some sort of network equipment or interface device 101. Such as device may be switch, router, modem, load balancer, buffer, or some other similar device that conditions the data or otherwise facilitates interface of the computer (e.g., 102, 104, 106) with the network 110. The interface may be embodied as an external device, or it may be at least partially integrated with the computer itself.

In an embodiment, the network equipment devices 101 are part of an out-of-band network 103, which is an abstraction of the actual network connectivity among these devices to show that they are subject to out-of-band management protocols that involve the use of management interfaces or serial ports for managing and connecting this equipment.

Such out-of-band management usually involves the use of a dedicated management channel for device maintenance. It allows a system administrator monitor and manage servers and other network-attached equipment by remote control regardless of whether the machine is powered on, or whether an operating system is installed or functional, and is in contrast to in-band management that involves simply connecting to a switch using normal network connectivity. Out-of-band management allows the network operator to establish trust boundaries in accessing the management function to apply it to network resources, and to ensure management connectivity.

In system 100, the out-of-band devices 101 are characterized in that they are not on the same network as the rest of the data protection computer (e.g., 102) and media devices (e.g., 118). Though some of the hardware cabling and wiring infrastructure may be the same, they generally use different network systems and protocols. The network equipment devices 101 can also have unconventional access programmatical interfaces (e.g., Telnet or SSH), and they also have a unique process of committing items from memory to local storage as part of user operations. Consequently, and as stated above, certain issues are associated with managing both out-of-band and in-band network devices, such as failing to commit changes to local persistent storage, needing to manually replicate changes to external systems, and lack of audit/history tracking and test/development use case enablement.

Whereas data protection methods utilized by the computer and storage devices of FIG. 1 utilize certain data protection techniques that efficiently protect and restore data of filesystems (e.g., laptop/desktop), NAS devices, virtual machines and applications such as databases, such methods are not accessible by the network equipment in present, known systems. For system 100 of FIG. 1, one or more embodiments of a network device data protection process 114 apply certain data protection processes to the maintenance of network equipment devices 101. Embodiments of process 114 essentially apply application-consistent backup techniques, like databases, to network equipment devices 101. Such devices are unique in that a majority of them have a two-phase "commit" function. Unlike regular applications that are protected, network devices do not have the same interface or even data path that use normal workflows. Network devices are controlled via an out-of-band management network 103 that requires a different architecture than currently provided in present systems. Embodiments of the network device data protection process 114 can discover network devices on the network, assign policies to those network devices and then protect those devices; it also enables other use cases like audit tracking and copy reuse.

In an embodiment, process 114 provides a new set of software called data protection networking device (DPND), that is responsible for backing up and restoring configuration changes for all network devices 101. Other functionality such as audit tracking and test/development copies will be integrated at the protection software. It should be noted that process 114 may be provided as an executable software routine, hardware component, or other module that is provided with or as part of one or each interface device 101, or as a network 110 or cloud-based process. The DPND functionality can be provided as the network device data protection process 114 as a component (e.g., hardware or firmware) or as an executable program executed in network 110 or as part of any device 101 or computer 106 of system 100.

In an embodiment, network devices 101 (also referred to as "network equipment" or "network equipment device" or "network interface devices") can be considered any of the following: managed switches, core routers, firewalls, load balancers, and so on. For the purpose of description, embodiments will be generally described with respect to managed switches, however it should be noted that embodiments are not so limited and may include any type of network equipment, interface, or infrastructure device.

When a network device is first deployed or installed, it typically has what is referred to as a "day 0 configuration," which are default settings for the device set by the manufacturer or vendor. As stated above, configuration parameters depend on the type of device, and can include parameters such as: network (e.g., VLAN) tags, per port activation/link speed, domain routing protocol (e.g., BGP/OSPF) settings, firewall rules, high availability/redundancy settings, and so on.

For a managed switch, such configuration parameters can be static routes, default port assignments, and so on. During the course of normal operation, such configuration parameters are changed with frequency that depends on network size, activity, scalability, topography, and so on. Heavily used or critical switches and routers may be regularly reconfigured with new port assignments, firewall settings, operating characteristics (e.g., voice, data, etc.), firmware upgrades, patches, bug fixes, and so on. These changes can be done either manually by a technician or system administrator, or they may be performed by an automated updating procedure that implements changes per a defined policy. For out-of-band devices, such changes are typically made while the devices are on the network and active. Embodiments facilitate the saving of configuration changes on these devices to persistent memory storage using data protection techniques instead of the simple out-of-band network protocols.

Figure 2:
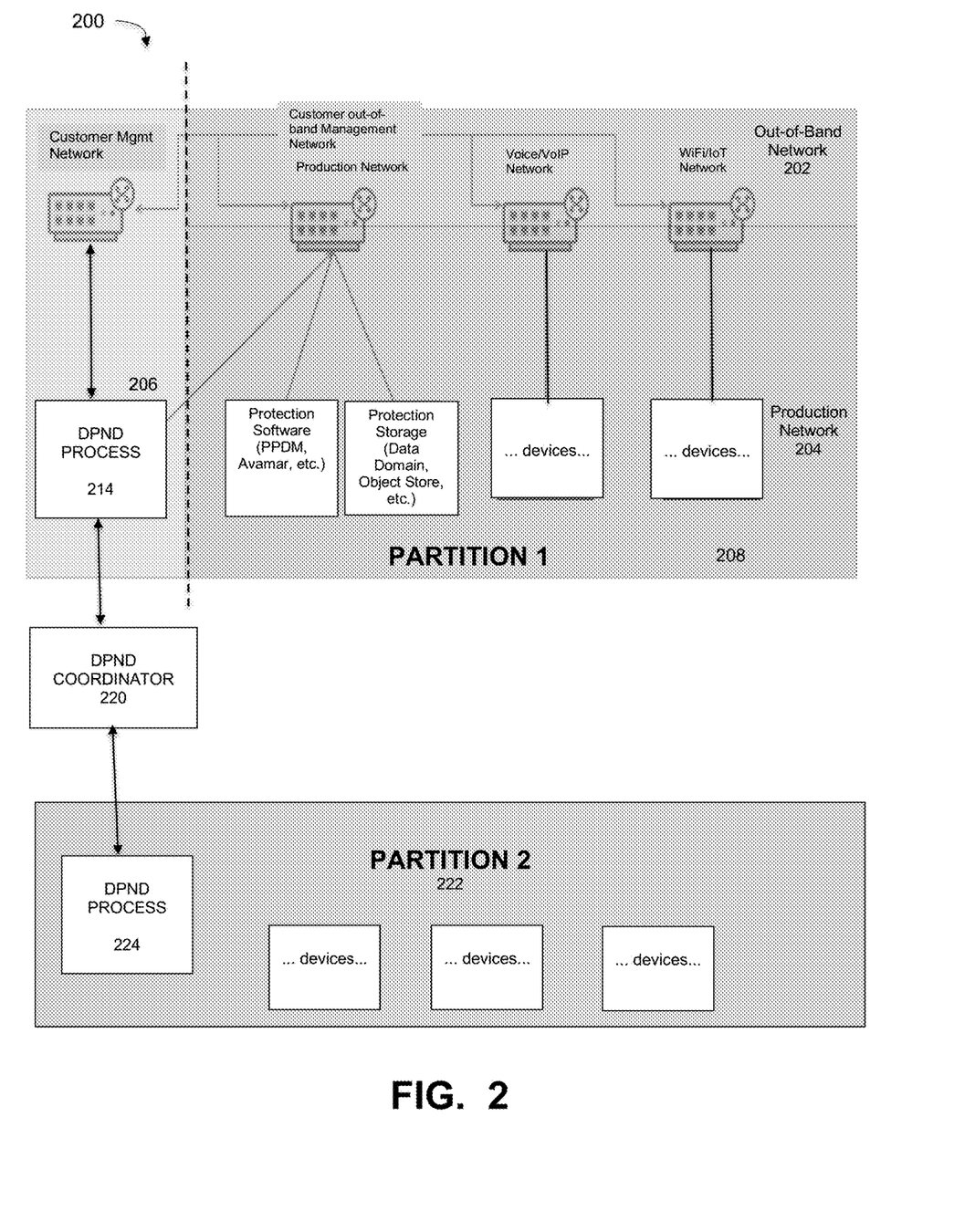
FIG. 2 illustrates an example user network that implements a data protection networking device process, under some embodiments.

FIG. 2 illustrates an example user network that implements a data protection networking device process, under some embodiments. System 200 represents a network comprising a number of user resources, such as production software, protection storage, client server computer, and devices in a production network 204. These resources are coupled to a network through network devices in out-of-band network 202, which is a secured and limited access network used to configure and monitor all network devices that is not accessible by the production network. Each network device (switch, router, firewall, etc.) has their management network port connected to the out-of-band network. The production network 204 is a series of networks that customers may sub-divide into. Three examples are shown for example as: production, Voice/VoIP and WiFi/IOT network, but embodiments are not so limited.

For the embodiment of FIG. 2, section 206 represents the network region where the DPND process 214 is installed. This is a dual-homed component or process in that it has access to both the out-of-band network 202 and the production network 204. Region 208 includes the resources and network devices that are managed by DPND process 214. The DPND process 214 may be deployed externally as a VM/physical device within the network or it could be embedded within one or more of the network devices. There may also be multiple instances of DPND in the customer network. The protection software and storage may be in the production network or in the out-of-band network, or it may even be hosted as a service. For purposes of description, DPND will be described as a single instance implementation that is dual homed (i.e., access to out-of-band and production network) and a local instance of protection software and storage, though embodiments are not so limited.

Each network device (e.g., managed switch, a firewall or router) usually has a different method for programmatic control. The traditional industry standard for such control has been Telnet, which is used to administer commands on devices through the use of command line interfaces (CLIs). Due to the insecurity of Telnet, best practices have led to network devices being put on restrictive 'management' networks, such as an out-of-band network. As security improved, other methods such as SSH (Secure Shell) and Rest APIs were added, but the practice of putting the management interface on an out-of-band network is still a viable solution.

Depending on the network device, model, version and the customer configuration, the DPND process is configured to support each of the following controlling interfaces: Telnet, SSH, ReST API, RestCONF, and vendor specific or similar protocols. In an embodiment, the DPND process supports a pluggable driver model which adds flexibility to handle a wide variety of network devices. Each driver will support a common set of use cases, such as: commit, backup, and restore operations.

Figure 3:
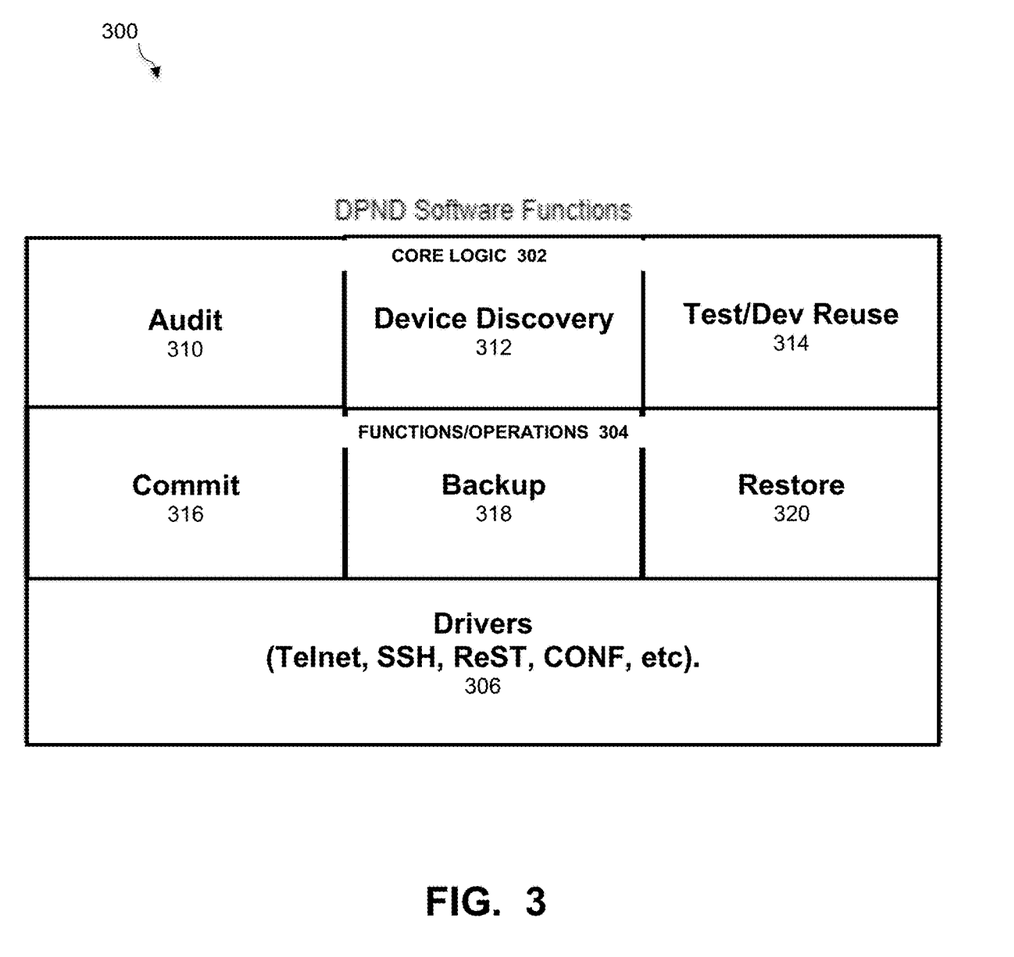
FIG. 3 is a sample driver model and implementation within the data protection networking device process software, under some embodiments.

FIG. 3 is a sample driver model and implementation within the DPND software, under some embodiments. The software model 300 of FIG. 3 comprises a core logic layer 302, a functions and operations layer 304 and a drivers layer 306. The drivers 306 represent drivers that support the interfaces listed above: Telnet, ReST, CONF, and so on. The functions/operations layer 304 comprise commit 316, backup 318, and restore 320 functions; and the core logic layer comprises certain applications such as audit 310, device discovery 312, and test/dev reuse 314.

With respect to the commit function for each driver, network devices typically have a two phase commit process. Such that changes on the network are first committed to resident memory of the network device, and then to local persistent storage of the network device. The resident memory is typically implemented as ternary content-addressable memory (TCAM). TCAM is a high-speed memory that stores data using three different inputs: 0, 1, and X to facilitate content searches in a single clock cycle. It is generally much faster than RAM memory, and is used in networking equipment to increase the speed of route lookups, packet classification and forwarding, and so on. During normal operation, changes made to the TCAM are live and applied to the network device. However if the network device reboots or loses power, any configuration in the TCAM is lost. The purpose of the commit function 316 for each driver is to save all configuration items from TCAM to the local persistent storage of the network device. Upon a reboot/power loss, the changes will be loaded from local persistent storage back to the device and thus will not be lost.

Coordinate Networking Protection

In an embodiment, the data protection processes and components of FIGS. 1-3 are used to provide a mechanism to protect multiple network devices within a partition and ensuing the configurations are in an application ("app") consistent state. In coordinate networking protection the term 'network partition' is used to denote a group of one or more network devices that are defined by users as a single logical unit. Likewise, the term 'consistent' means synchronizing the protection state of these devices such that if network devices A and B are backed up, both would have data that would match each other, i.e., their data would be consistent with one another, so that during a restore, the firewall rules/data/etc. would work together. For example, a scenario in which firewall rules need to be applied to both devices, A and B, the backup should include a state where the rules are applied to both A and B or a state where none of the rules are applied.

For this embodiment, one or more network devices to be protected are grouped into respective partitions, and the data protection of devices within each partition are coordinated through a DPND coordinator component or function. FIG. 2 illustrates coordination of network protection for different partitions using a DPND coordinator, under some embodiments. As shown in FIG. 2, region 208 includes the resources and network devices that are managed by DPND process 214, and represents one partition within the system, denoted "Partition 1." For this embodiment, the DPND process 214 is dual-homed so that it can interact with its own network devices and with other external or production network devices through a DPND coordinator component 220. For the example embodiment of FIG. 2, a second partition 222 ("Partition 2") is connected to a DPND process 224 of Partition 1 through the DPND coordinator 220. This partition can have any number of devices as shown and can have the same composition and topology as Partition 1, or it can have a different configuration. Though only two partitions are shown, any practical number of partitions may be coupled to DPND coordinator 220.

Figure 4:
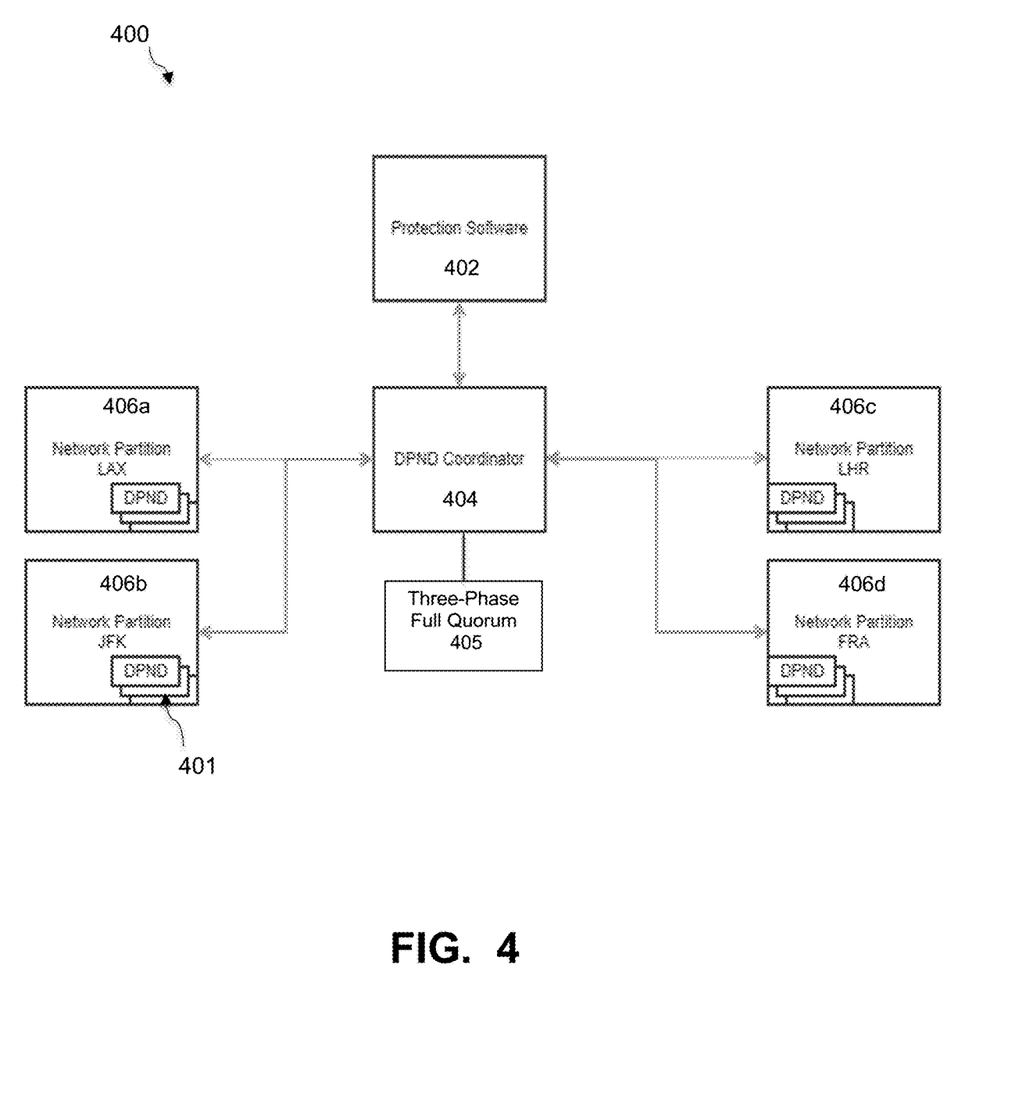
FIG. 4 illustrates the use of a DPND coordinator with a plurality of different network partitions, under some embodiments.

FIG. 4 illustrates the use of a DPND coordinator with a plurality of different network partitions, under some embodiments. As shown in FIG. 4, a central DPND coordinator 404 communicates with a number of different partitions 406a-d, where each partition has its own DPND process 401. The terms 'DPND unit' or 'DPND processing unit' may be used generally refer to a partition component that executes the DPND process 401. For the example of FIG. 4, four different partitions denoting individual international airports are shown, thus partition LAX in Los Angeles, partition JFK in New York, partition LHR in London, and partition FRA in Frankfurt. Each individual partition can comprise any composition of devices, routers, interfaces, and so on, as shown in FIG. 2. Each partition also has a respective DPND process for performing the intra-partition data protection tasks for its own devices, and for interfacing with the DPND coordinator 404.

A network partition is generally defined to be a series of network devices that are grouped together and communicate with a single DPND coordinator 404, where the DPND coordinator is a system component that will backup multiple network devices in a consistent state within a single network partition. An example of such network partition processing, as shown in FIG. 4, could be all network devices in the Los Angeles facility while another network partition could be all network devices in the New York facility, and so on.

As shown in FIG. 4, protection software 402 interacts with each DPDN coordinator 404, which in turn acts on a partition 406x that has a DPND process. Protection software 402 may represent any appropriate data protection software such as Avamar or PowerProtect Data Manager. In general, a system-wide backup process must backup all programs, data, operating states, and so on, of all the devices (computers, nodes, infrastructure, and so on) of the system by capturing a valid state at a point in time (e.g., snapshot backup) that can then be reapplied to the system to bring it back up in a recovery or restore process. Within a system-wide backup, applications and operating system software is backed up during an application backup process, while device states are backed up in a device backup process. For purposes of description, the protection software 402 is considered to perform a device backup of the infrastructure devices in the system. However, it should be noted that protection software 402 may also include or be included within a greater overall backup process that also backs up application, operating system, and other software programs running in the system 100.

In an embodiment, the DPND coordinator 404 protects network partitions based on a SLA (service level agreement) policy, as opposed to protecting single network devices according to a fixed schedule (e.g. backups at midnight). The DPND coordinator 402 manages and tells specific DPND processes within the partitions to perform their built-in data protection functions. This includes network discovery, save changes from TCAM (ternary content addressable memory) to local persistent storage, save changes off the network device(s), provide audit and tracking information along with test/development copy reuse, and other appropriate functions. In an embodiment, the backup software connects directly to the DPND coordinator not to any specific partition DPND process. The protection software 402 in conjunction with DPND coordinator 404 determines the proper data protection policies. The DPND coordinator communicates with and ensures that these protection policies get applied within each partition.

For the example embodiment of FIG. 4, one example network partition (406a) is called LAX and represents all the network devices in the Los Angeles Office (switches, routers, firewalls, etc.). Other Network Partitions may also exist as defined by the user. Each network partition includes as many DPND backup proxies as needed to protect all the network devices. Each Network Partition and all the DPND devices would be connected to the single DPND coordinator 404 which protects multiple network partitions in a crash consistent manner.

In general, network partitions are defined by the customer in their network topology and deployment of a DPND process within a partition, and the DPND coordinator generally imposes no constraints on how a network partition is defined. They are both flexible enough to follow whatever schema a user dictates. In general, network partitions are not always strictly fixed, and can change over time. The example network of FIG. 4 can also be scaled up to several different regions or partition groups, each of which may be synchronized by their own DPND coordinators.

The DPND coordinator 404 can individually delegate work to each DPND process within a partition. The DPND coordinator performs this delegation by first getting the work item from the backup software (e.g., a backup policy). From there, the DPND coordinator sends a copy of that backup policy to each DPND process that matches the backup policy. The backup policy may thus identify specific partitions within a number of partitions that are to be backed up according to a certain backup schedule. This identification can be based on location, identity, roles, importance, or other salient characteristics. For the example embodiment of FIG. 4 with a single DPND coordinator 404 interacting with multiple network partitions 406x, a backup policy might specify that network partitions LAX and JFK are logically part of one policy, while network partitions LHR and FRA are on a different policy.

In an embodiment, data transmissions between the DPND coordinator and the DPND processes occur over secure connections using industry standards such as TLS (transport layer security), and either TCP or UDP can be used. It is the role of the coordinator to ensure that messages are received by each DPND processing unit. This can be implemented through the DPND units acknowledging the request. Communication can be done using any method such as JSON ReST Message or others such as protocol buffers from Google, and the like.

Once DPND coordinator 404 pushes the network policy to each affected DPDN process within each network partition, the DPND process 401 runs that policy for its respective partition. It does this by keeping a local copy of the backup policy. It will run that backup policy on whatever schedule and rules that were defined within the policy. For example, a backup policy may require all network devices to be backed up once a day or on a weekly basis, etc. It will continue to use the local copy until it receives a new notification from its DPND coordinator to update its policies. This mechanism allows for minimal network communication, and in the case of network outages or unavailability of the DPND coordinator, data protection policies can still be executed.

Figure 5:
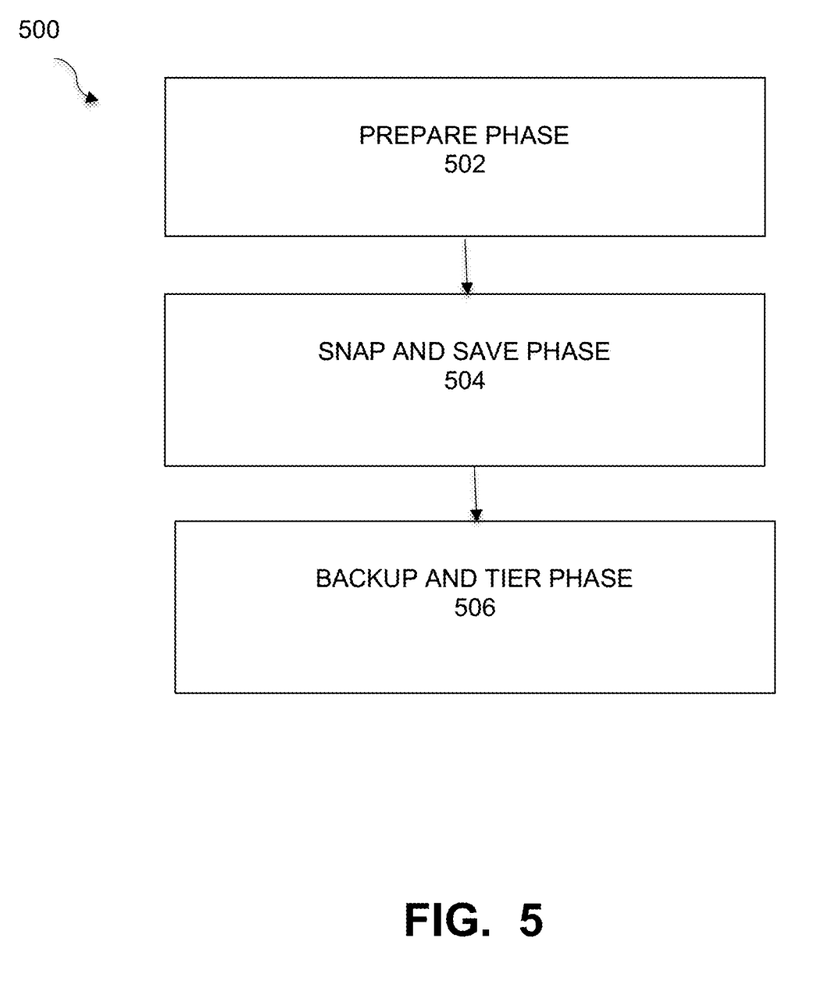
FIG. 5 illustrates the three phases of a three-phase full quorum method, under some embodiments.

In an embodiment, the DPND system and coordinator 402 provides application consistent network protection using a three-phase full quorum (3P-FQ) mechanism 405. FIG. 5 illustrates the main process phases of a three-phase full quorum method, under some embodiments. As shown in FIG. 5, the 3P-FQ process comprises the three phases of: a prepare phase 502, a snap and save phase 504, and a backup and tier phase 506. Details for each of these steps will be provided in greater detail below.

With respect to the prepare phase 502, because network devices have custom hardware, such as ASICs or other programmable logic (e.g., PLA, PLD, etc.) and run non-standard x86/x64 platforms, developing data protection software to be embedded within these devices is generally challenging and uses additional resources that takes away from network functionality. For this reason, the prepare phase is an external process that relies on polling to ensure consistency is achieved in order to derive sufficient compatibility among network devices. For polling, for each network partition as defined by the DPND coordinator 404, the set of DPND devices/proxies will poll each network device and prepare it to perform a backup. The prepare phase will continue to prepare to perform a backup until either a timeout limit is reached or a snap and save command is issued. The prepare phase consists of: (1) acquiring and creating any login sessions (SSH, ReST API Tokens); (2) ensuring the device is online; (2) ensuring the device is not in maintenance/lock-down mode and can accept backup request any other device specific operations. If any network device is not successful in the prepare phase, the protection software 402 will terminate the backup as it is unable to create a consistent network backup.

Figure 6A:
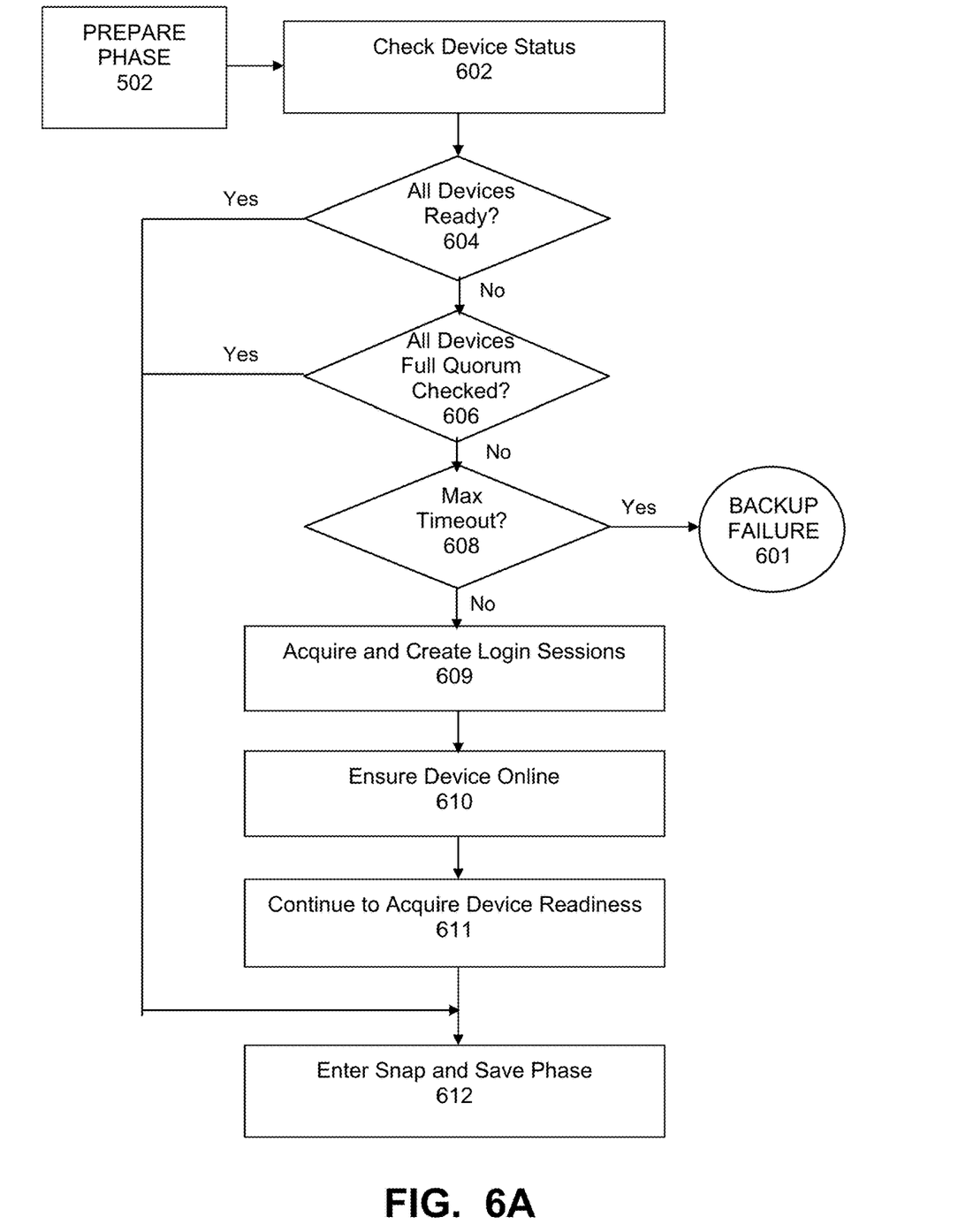
FIG. 6A is a flowchart illustrating the prepare phase for a method of providing application consistent data protection for multiple networking devices, under some embodiments.

FIG. 6A is a flowchart illustrating the prepare phase 502 for a method of providing application consistent data protection for multiple networking devices, under some embodiments. The prepare phase 502 begins by the system checking the device status of all of the network (infrastructure) devices in the system, 602. In block 604 it is determined whether or not all of the network devices are ready. If so, the process proceeds to the snap and save phase 504, through entry step 612. The three phase full quorum process requires that all network devices be ready, hence the term 'full quorum.' Thus, if not all device are ready (step 604), the process next determines whether or not all devices have achieved full quorum checks, 606. In an embodiment, a full quorum is defined as all possible network devices within a system. It should be noted, however, that a full quorum may constitute a defined subset of devices, such as all active, necessary or relevant devices within a network or subnetwork, all non-obsoleted devices, and so on.

The three phase full quorum process provides some amount of time for all devices to be ready. For this embodiment, the DPND coordinator 404 ensures that devices that are deemed ready in step 604 remain in the prepare phase 502 until a full quorum is reached. This is achieved by continuing to check in on those devices to ensure their status/availability has not changed while other devices become ready. The protocol to perform a continuous periodic check is generally defined by the system developer. For example, using the driver model of FIG. 3, one type of network device may require the system to Telnet into the device, login, and then run a command, while another type of network device may be configured to respond to a standard query signal.

In an example environment there might be one hundred network devices in a single partition controlled by a couple of DPND proxies. Within a few seconds, a majority of those devices could have completed the prepare phase successfully while a small number might take a little bit longer to complete. Thus, a timeout period is defined to set a maximum time period to perform the full quorum check 606. The timeout period may be on the order of seconds, fractions of a second, minutes, or any other appropriate time unit. The time period may be fixed for all backup sessions, or it may be configured per backup session. If all devices pass the full quorum check, the process enters the snap and save phase through step 612.

Any device not ready within the timeout period or below the maximum time will cause the quorum not to be reached. This, in turn, will cause the entire system backup session to be aborted. Thus, if not all devices pass the quorum check 606, the ready time for any omitted devices is monitored and checked. If in step 608, a maximum timeout period is reached for any omitted or late device, then the DPND coordinator 404 will cancel the prepare phase and inform protection software 402 that it was unable to complete the prepare phase. This will cause a backup failure 601. It is then left up to the protection software and the user as to whether they retry the backup, or proceed with the backup process understanding that certain network devices will be left out.

Once all devices in the quorum are deemed ready, the prepare phase 502 continues by acquiring and creating login sessions 609. This prepare phase generally comprises ensuring that each device is online, 610, and continuing to acquire device readiness, 611. The prepare phase can include multiple steps. In general, most network devices require a user to login and then run some command. This command could be 'show me status' or anything else. This is essentially a non-operation (NOP) just to make sure the system is responsive and ready to take on requests. If this process fails, it is assumed the network device will not be ready to take on a backup request. As a specific example, Cisco devices might require that a Telnet to the device with a username and password, and then a command issue, e.g., 'show mac address-table'. If the command succeeds, then the device can be presumed to be ready to take a backup; whereas if it fails, it is certainly known to be not ready to take a backup. Likewise, another device (e.g., Dell) might require a ReST call. In this case, rather than Telnet, the user issues a HTTPS ReST call to (1) login, (2) acquire an authentication token and then (3) issue some command. The command is not necessarily important, simply the device's response to the command.

Figure 6B:
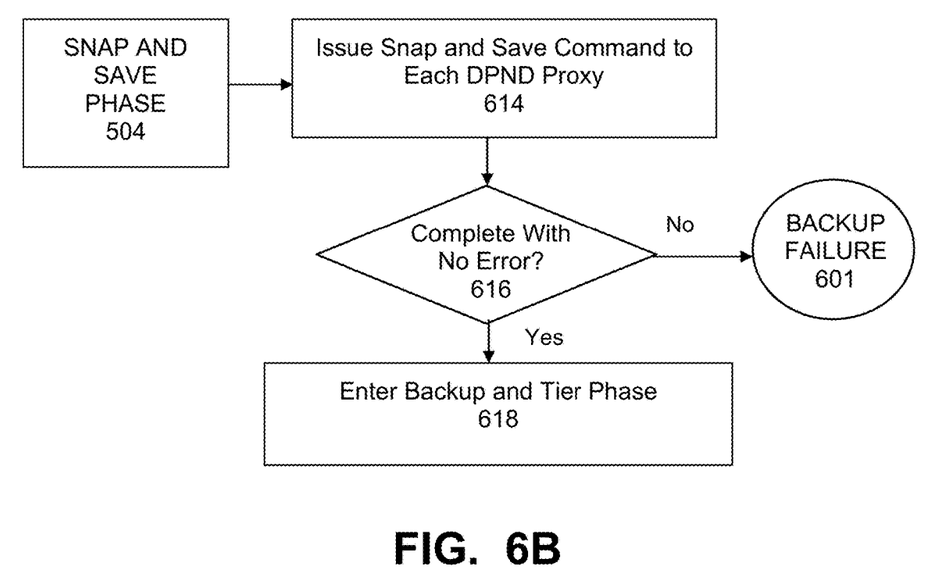
FIG. 6B is a flowchart that illustrates the snap and save phase following the prepare phase of FIG. 6A, under some embodiments.

Once the prepare phase 502 is complete without a backup failure 601, the process enters the snap and save phase 504 through step 612 and then the backup and tier phase 506. FIG. 6B is a flowchart that illustrates the snap and save phase following the prepare phase of FIG. 6A, under some embodiments.

With respect to the snap and save phase 504, this phase is run after a set of successful full quorum calls have completed in succession. The number of successful quorum calls can be defined by the user or as a default system setting, for example ten successful calls. That is, all network devices must have reported with a success status for their respective prepare phase for ten successive checks. The DPND coordinator 404 will control this and tabulate the number of successful full quorum checks that are completed. Once ready, DPND coordinator will issue the snap and save command to all DPND proxies. In turn, each DPND proxy will issue the network device's respective commit command to backup all the network device configurations to the network device's local persistent storage.

As shown in FIG. 6B, the snap and save phase 504 comprises the system issuing a snap and save command to each DPND proxy, 614. The snap step is the taking of a normal snapshot backup using the protection process 402 snapshot backup processes. The snap and save process saves all the configuration items for each device to local storage in the system or on each device. Based on the driver model in FIG. 3, the snap and save process might issue a command over Telnet, a ReST API call, or similar call depending on the network device, make, model, etc. In Some systems, the snap process simply means that they issue the 'commit' command over Telnet (or SSH) and that will save all settings that are in memory to the local disk of the network device, while other systems might not have a 'commit' option because their settings are always written to disk when made. This exemplifies why network equipment devices are unique compared to other devices in an overall storage or computing network. In the case where the system does not have a 'commit' option, the snap and save step can skipped, as the changes would be picked up in the last phase (backup and tier) and then transferred to data protection storage.

The DPND coordinator track the snap and save results and determines if the snap and save commands completed successfully for all devices without any errors, 616. If there are any errors by any of the devices, a backup failure 601 is signaled and the present backup session is aborted. In the case of failures, the system can be configured to retry the snap and save phase 504 on the effected network devices. Thus, if in block 616, errors occurred during the snap and save process that could not be fixed by the DPND proxies or coordinator, the information will be transmitted up to the DPND coordinator which will cancel the backup job. The DPND coordinator will inform protection software and the end user and it will be up to them if they should retry or proceed with the snap and save with the understanding that certain network devices will be left out of the backup. Once all devices have successfully completed the snap and save phase 504, the process enters the backup and tier phase through step 618.

Figure 6C:
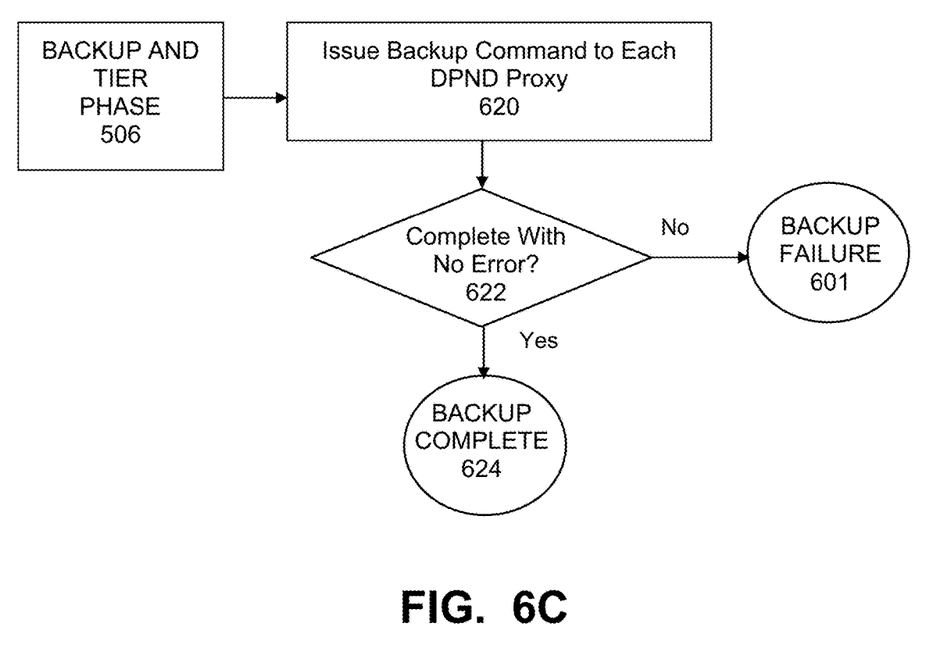
FIG. 6C is a flowchart that illustrates the backup and tier phase following the snap and save phase of FIG. 6B, under some embodiments.

FIG. 6C is a flowchart that illustrates the backup and tier phase following the snap and save phase of FIG. 6B, under some embodiments. In the backup and tier phase 506, the DPND coordinator 404 will issue a backup command to each DPND proxy to retrieve and backup the configuration off of the respective network device and on to protection storage, 620. This process need not be completed in sync with the entire network since the snap and save process saved all the configuration items to the local storage. This phase involves getting the already completed backup configuration items off to secondary storage, as part of the 'tier' process of this phase. That is, the backed up data from phase 504 is moved from local storage to a different storage tier, such as protection storage or any other appropriate storage device. If, in step 622, it is determined that the backup and tier phase was completed for all devices without error, then the present backup operation is complete, 624. If there is any error, however, a backup failure 601 will occur. As with the snap and save phase of FIG. 6B, in the case of backup and tier phase failures, the system can be configured to retry the backup and tier phase 506 on the effected network devices. If any such error occurred that cannot be fixed by the DPND proxies or coordinator, the information will be transmitted up to the DPND coordinator which will cancel the backup job.

In general, the only data saved for a network equipment device is its configuration information. Such configuration information comprises specific operating parameters or data such as make, model, version, network (LAN, VLAN) address, port information, and so on. The snap and save phase saves the configuration data from device memory to the local disk of the network device. The save and tier phase then moves this data from the local disk of the network device to data protection.

With respect to the backup process, in an embodiment, the DPND process 401 acts as a proxy or man in the middle, between the network device and the protection storage. Such a 3-way (man in the middle) solution comprises implementing the DPND process or component running or placed in between the network device and the protection storage. For this implementation, DPND is run outside the source on its own standalone machine. In an example system embodiment, the source (network device) is box 1, the proxy/man in the middle where DPND runs is box 2, and the protection storage (e.g., DataDomain, AWS object storage) is box 3. Alternatively, DPND can run inside the source (i.e., network device) which is more of a direct to storage model, or client-server model. The outside implementation is illustrated in FIGS. 7A and 7B with the DPND component/process functionally disposed between the network device and the protection storage.

Figure 7A:
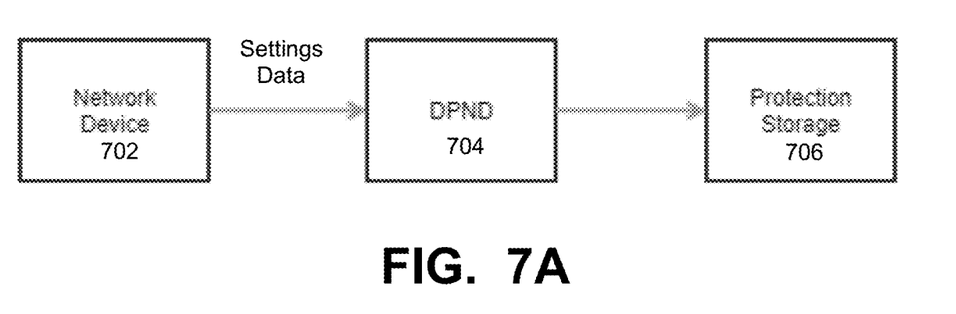
FIG. 7A is an example data flow diagram of a DPND backup function, under some embodiments.
Figure 7B:
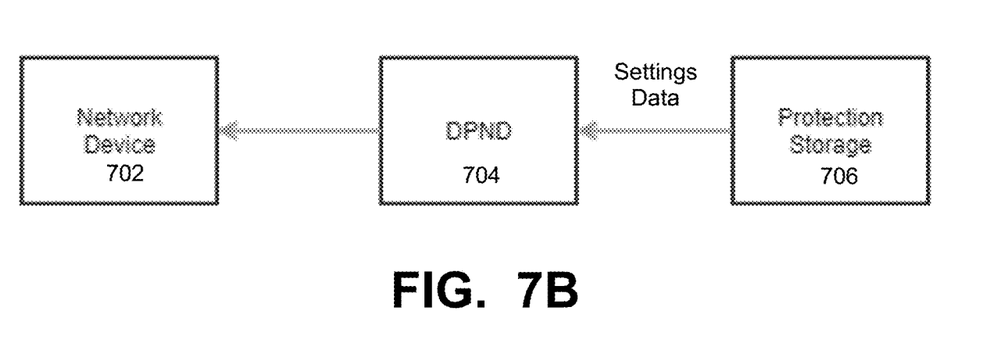
FIG. 7B is an example data flow diagram of the DPND restore function, under some embodiments.

FIG. 7A is an example data flow diagram of the DPND backup function, under some embodiments. For the backup function, the DPND process 704 is functionally coupled between the network device 702 and protection storage 706 and facilitates the copying of setting data from the network device (from its TCAM memory) to the protection storage.

In an embodiment, the DPND process 401 relies on data protection software within the system to perform orchestration of the backup. Thus, with reference to system 100 of FIG. 1, DPND process 114 uses the backup server 102 and backup management process 112 to perform the backup function. Alternatively, DPND could perform this functionality itself. This process may include providing schedules and retention periods, for example.

The restore function replaces the existing configuration that was backed up from the network device back to the local persistent storage of the network device. Once configuration is placed, the restore command will provide an option to apply those settings to the live system. In some cases, network operators may want to only restore the configuration file but not apply them so further modifications can be made. In other cases, network operators will want those changed applied after they are restored to the device. Some network devices may not have the two stage commit process in which DPND with the pluggable driver model 300 will be forced to apply the settings to the live system after restore.

FIG. 7B is an example data flow diagram of the DPND restore function, under some embodiments. For the restore function, like the backup function, the DPND process 704 acts as a proxy or man in the middle between the protection storage 706 and the network device 702. In this case, the settings data is transferred from the protection storage 706 to be copied to or restored back on the network device 702. The same features of deduplication, encryption, and/or compression may also apply. Likewise, for the restore function, the DPND process 114 might also rely on system-wise data protection software 112, or it may use its own functionality. When restoring configuration data, DPND can restore to the data to the same device or to a new device. For example, in a disaster recovery scenario, placing the configuration on a different device than the original network device may be required.

Embodiments thus provide a three-phase full quorum commit method that enables DPND processes to back up network devices that do not offer direct hooks in order to have application consistent protection. Embodiments take into consideration whether or not network devices are ready to perform a backup (e.g., devices are online, authorization keys are received, and so on). A defined set of criteria, such as reaching a full quorum within a set period of time, and maintaining the full quorum must be satisfied before the system can issue a 'commit' command. The three phase backup process reduces the chance of changes to network devices from corrupting consistency among the saved states of the different and disparate network devices. In this manner, it is possible to have multiple routers or switches of different makes and models participate together as a unified backup, i.e., a network partition. This is achieved by ensuring that all network devices are working (connected, authenticated, etc.) and when all devices are verified to be in a ready state, the commit command is issued to save all configuration data from device memory to local disk. Once on the local disk, there is no risk of modification or changes, so this data can then be tiered to secondary or other storage.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 8:
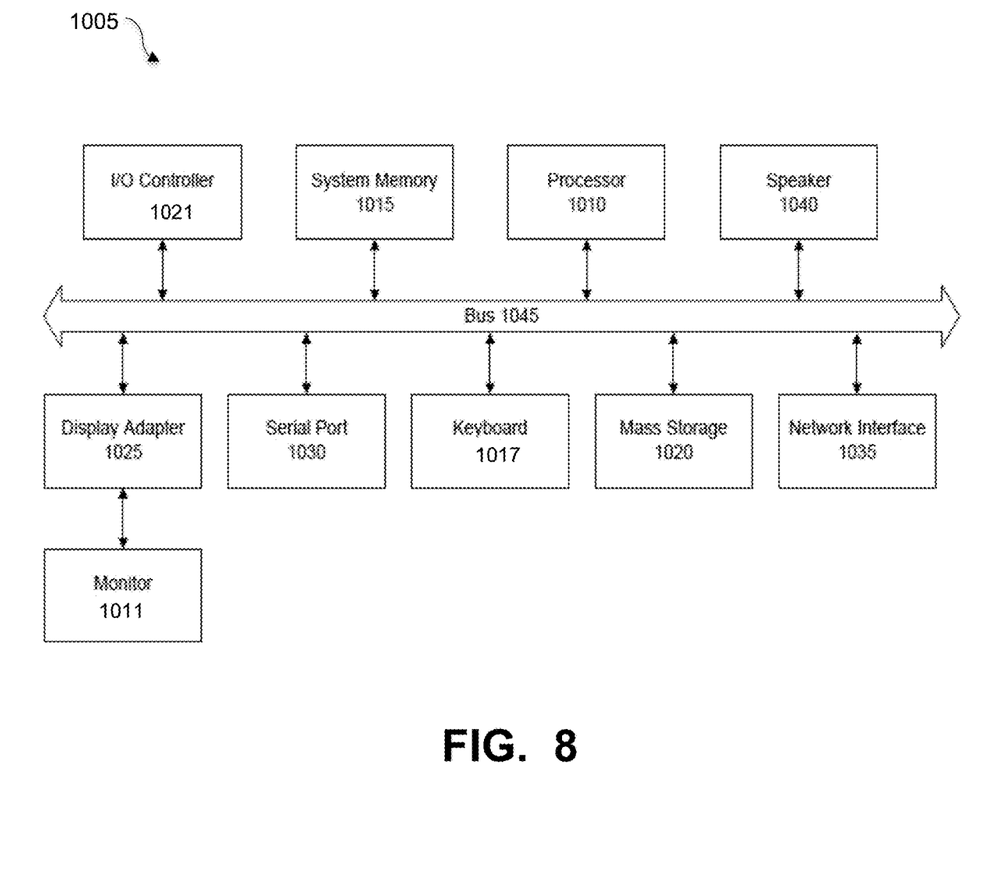
FIG. 8 is a system block diagram of a computer system used to execute one or more software components of the data protection networking device process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the systems and methods described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB)

port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing application consistent backup of network equipment devices in a network, comprising:
   determining a readiness of all the network equipment devices in the network to perform the backup in a prepare phase using a period of time accommodating a respective communication protocol of each network equipment device;
   grouping two or more of the network equipment devices into a partition of a plurality of partitions;
   configuring a data protection network device to backup and restore configuration changes of the partition using a three phase full quorum (3P-FQ) mechanism to provide all devices a same amount of time to invoke protection measures through individual prepare, snap, and save phases using device ternary content-addressable memory (TCAM), and to protect the network equipment devices of the partition based on a service level (SLA) policy apart from a fixed maintenance schedule, until all devices are ready;
   performing, if all network equipment devices are determined to be ready, a snap and save phase saving configuration data including initial settings and the configuration changes of each of the network equipment devices to local storage to allow backup of a corresponding network equipment device to be completed out of sync with the plurality of network equipment devices through use of the local storage storing configuration items of the corresponding network device; and performing, if all network equipment devices in the partition perform the snap and save phase, a backup and tier phase storing the configuration data of each of the network equipment devices to secondary storage from the local storage.

2. The method of claim 1 wherein the step of determining the readiness comprises:
defining a maximum time period of the period of time for readiness;
first determining if all devices are ready upon an initial readiness check; and
second determining, if not all the network equipment devices are ready upon the initial readiness check, whether all non-ready devices are ready within the maximum time period, and aborting the backup if not, otherwise acquiring and creating login sessions, and continuing to check that all the network equipment devices remain online and ready during the maximum time period.

3. The method of claim 2 wherein the step of continuing to check that all network equipment devices remain online and ready comprises continuously and periodically sending a status request signal to each device of all devices.

4. The method of claim 2 wherein readiness comprises a respective device being online and connected to the network and in control of all required authorization keys for network access, and is ready to accept a backup request.

5. The method of claim 1 wherein the snap and save phase comprises:
taking a snapshot backup of respective configuration data of each network equipment device;
saving the snapshot backup to the local storage; and
aborting the backup if any device of all network equipment devices fails taking the snapshot backup or saving the snapshot backup.

6. The method of claim 1 wherein the backup and tier phase comprises:
issuing a backup command to each network equipment device;
moving the snapshot backup from the local storage to the secondary storage; and
aborting the backup if any device of all network equipment devices fails executing the backup command or moving the snapshot backup.

7. The method of claim 1 wherein the network equipment devices comprise a plurality of interface devices using different logic circuits and programming code, and further comprise at least one of an out-of-band device coupled to other network equipment devices through a network implementing out-of-band protocols.

8. The method of claim 7 wherein the out-of-band device is an interface device comprising one of: a managed switch, a router, a firewall, and a buffer.

9. The method of claim 8 wherein the network comprises the out-of-band protocol network and a production software network coupling a plurality of computers together for the execution of one or more applications.

10. A computer-implemented method of providing application consistent backup of network equipment devices in a network, comprising:
grouping two or more of the network equipment devices into a partition of a plurality of partitions;
configuring a data protection network device to backup and restore configuration changes of the partition using a three phase full quorum (3P-FQ) mechanism to provide all devices a same amount of time to invoke protection measures through individual prepare, snap, and save phases using device ternary content-addressable memory (TCAM), and to protect the network equipment devices of the partition based on a service level (SLA) policy apart from a fixed maintenance schedule, until all devices are ready;
determining if a full quorum of network equipment devices are ready for the backup;
defining a maximum timeout period to allow the full quorum to reach readiness for the backup, the maximum timeout period defining a period of time accommodating a respective communication protocol of each network equipment device;
taking a snapshot backup of each network equipment device in the partition if the full quorum is ready;
storing the snapshot backup in local storage in a snap and save phase saving configuration data including initial settings and the configuration changes of each of the network equipment devices to local storage to allow backup of a corresponding network equipment device to be completed out of sync with the plurality of network equipment devices through use of the local storage storing configuration items of the corresponding network device;
backing up the snapshot backup from local storage to secondary storage; and
aborting the backup if at least one of: any network equipment device is not ready for the backup within the maximum timeout period, fails taking the snapshot backup, or fails backing up its configuration data to the secondary storage.

11. The method of claim 10 wherein each network equipment device is an interface device comprising one of: a managed switch, a router, a firewall, and a buffer.

12. The method of claim 11 wherein the snapshot backup comprises configuration information for a respective network equipment device and includes at least one of make, model, version, network address, and port configuration.

13. The method of claim 12 wherein the network equipment devices comprise a plurality of interface devices using different logic circuits and programming code, and further comprise at least one of an out-of-band device coupled to other network equipment devices through a network implementing out-of-band protocols.

14. The method of claim 10 wherein readiness comprises a respective device being online and connected to the network and in control of all required authorization keys for network access.

15. The method of claim 10 further comprising acquiring and creating login sessions, and continuing to check that all the network equipment devices remain online and ready during the maximum time period.

16. The method of claim 10 wherein the backup is performed by data protection software executed in a backup server of the network, and each network equipment device executes a data protection network device (DPND) process managed by a respective DPND device coupled to the backup server.

17. A system for providing application consistent backup of network equipment devices in a network, comprising:
a backup server providing backup software for backing up the network equipment devices according to one or more backup policies, wherein at least some of the network equipment devices are grouped into a partition of a plurality of partitions; and
a data protection network device (DPND) coordinator between the backup software and a respective DPND process deployed in each of the network equipment devices, wherein the DPND coordinator is configured to backup and restore configuration changes of the partition using a three phase full quorum (3P-FQ) mechanism to provide all devices a same amount of time to invoke protection measures through individual prepare, snap, and save phases using device ternary content-addressable memory (TCAM), and to protect the network equipment devices of the partition based on a service level (SLA) policy apart from a fixed maintenance schedule, until all devices are ready, and to:

determine a readiness of all the network equipment devices in the network to perform the backup in a prepare phase using a period of time accommodating a respective communication protocol of each network equipment device;

perform, if all network equipment devices are determined to be ready, a snap and save phase saving configuration data of each of the network equipment devices to local storage a snap and save phase saving configuration data including initial settings and the configuration changes of each of the network equipment devices to local storage to allow backup of a corresponding network equipment device to be completed out of sync with the plurality of network equipment devices through use of the local storage storing configuration items of the corresponding network device; and perform, if all network equipment devices perform the snap and save phase, a backup and tier phase storing the configuration data including initial settings and the configuration changes of each of the network equipment devices in the partition to secondary storage from the local storage.

18. The system of claim 17 wherein each network equipment device is an interface device comprising one of: a managed switch, a router, a firewall, and a buffer.

19. The system of claim 18 wherein the network equipment devices comprise a plurality of interface devices using different logic circuits and programming code, and further comprise at least one of an out-of-band device coupled to other network equipment devices through a network implementing out-of-band protocols.

20. The system of claim 19 wherein the snapshot backup comprises configuration information for a respective network equipment device, and wherein readiness comprises a respective device being online and connected to the network and in control of all required authorization keys for network access.

\* \* \* \* \*